United States Patent
Tang

(10) Patent No.: US 9,817,266 B2
(45) Date of Patent: Nov. 14, 2017

(54) POLARIZER AND TRANSPARENT DISPLAY

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 93 days.

(21) Appl. No.: 15/011,327

(22) Filed: Jan. 29, 2016

(65) Prior Publication Data

US 2017/0131593 A1     May 11, 2017

(30) Foreign Application Priority Data

Nov. 9, 2015   (CN) .......................... 2015 1 0755809

(51) Int. Cl.
G02F 1/1335     (2006.01)
F21V 8/00       (2006.01)

(52) U.S. Cl.
CPC ..... G02F 1/133528 (2013.01); G02B 6/0055 (2013.01); G02B 6/0056 (2013.01); *G02F 2001/133538* (2013.01); *G02F 2001/133562* (2013.01); *G02F 2001/133567* (2013.01)

(58) Field of Classification Search
CPC ... G02F 1/133528; G02F 2001/133562; G02F 2001/133567
See application file for complete search history.

(56) References Cited

U.S. PATENT DOCUMENTS 8,233,113 B2 *  7/2012  Shikii .................. F21V 9/14
                                                         349/61

FOREIGN PATENT DOCUMENTS

| CN | 101271199 A | 9/2008 |
|----|-------------|--------|
| CN | 101965478 A | 2/2011 |
| CN | 102087437 A | 6/2011 |
| CN | 102707487 A | 10/2012 |
| CN | 104375325 A | 2/2015 |
| CN | 104459863 A | 3/2015 |
| GB | 2433639 A   | 6/2007 |

* cited by examiner

*Primary Examiner* — Dung Nguyen
(74) *Attorney, Agent, or Firm* — Andrew C. Cheng

(57) ABSTRACT

The present invention discloses a polarizer, comprising a first protective layer, a polarization layer and a second protective layer, which are sequentially stacked up in a first direction, and the polarization layer comprises a plurality of polarization regions and a plurality of transmittance regions, and the plurality of polarization regions and the plurality of transmittance regions are alternately aligned on a plane perpendicular to the first direction, and the polarization regions are employed to transmit through linear polarization light in a polarization axis of the polarization regions, and the transmittance regions are employed to transmit through natural light. The polarizer of the present invention can selectively transmit the natural light to raise the transmittance of the display utilizing the polarizer. The present invention also discloses a transparent display with high transmittance.

7 Claims, 2 Drawing Sheets

POLARIZER AND TRANSPARENT DISPLAY

FIELD OF THE INVENTION

The present invention relates to a transparent display technology field, and more particularly to a polarizer and a transparent display.

BACKGROUND OF THE INVENTION

The transparent display means that the display itself possesses the light penetration of a certain degree, which can allow the user can clearly see the background behind the display as watching the display. Therefore, the transparent display is applied for building widows, car windows or shop windows.

For realizing to show the image pictures and the background pictures at the same time, the transparent display generally divides the pixel regions in the panel into the display regions and the transparent regions. The display regions show the image pictures, and the transparent regions do not comprise color resist to achieve the transparent display. Although the transparent regions do not have color resist, the light reflected by a portion of the background object is absorbed by the lower polarizer when the light reflected by the background object passes through the upper polarizer and the lower polarizer. Meanwhile, the light passing through the lower polarizer cannot completely accomplish the operation of rotating 90° polarization state. Namely, a portion of the light passing through the liquid crystal layer will be filtered again as passing through the upper polarizer. The transmittance of the light reflected by the background object in the transparent regions is seriously lost to severely influence the brightness and the image quality of the background object.

SUMMARY OF THE INVENTION

An objective of the present invention is to provide a polarizer capable of selectively transmitting the natural light and a transparent display with high transmittance.

For realizing the aforesaid objective, the technical solution utilized by the embodiments of the present invention is:

First, provided is a polarizer, comprising a first protective layer, a polarization layer and a second protective layer, which are sequentially stacked up in a first direction, and the polarization layer comprises a plurality of polarization regions and a plurality of transmittance regions, and the plurality of polarization regions and the plurality of transmittance regions are alternately aligned on a plane perpendicular to the first direction, and the polarization regions are employed to transmit through linear polarization light in a polarization axis of the polarization regions, and the transmittance regions are employed to transmit through natural light.

Preferably, the transmittance regions of the polarization layer are filled with transparent glue or air.

Preferably, the polarization regions of the polarization layer are filled with organic polarization material or metal wire gate polarization material.

Second, further provided is a transparent display, comprising a backlight module, a first polarizer, a liquid crystal layer and a second polarizer, which are sequentially stacked up in a first direction;

the first polarizer comprises a first polarization layer, and the first polarization layer comprises a plurality of first polarization regions and a plurality of first transmittance regions, and the plurality of first polarization regions and the plurality of first transmittance regions are alternately aligned on a plane perpendicular to a first direction, and the first polarization regions are employed to transmit through linear polarization light in a polarization axis of the first polarization regions, and the first transmittance regions are employed to transmit through natural light;

the liquid crystal layer comprises a plurality of display regions and a plurality of transparent regions, and the plurality of display regions and the plurality of transparent regions are alternately aligned on the plane perpendicular to the first direction;

the second polarizer comprises a second polarization layer, and the second polarization layer comprises a plurality of second polarization regions and a plurality of second transmittance regions, and the plurality of second polarization regions and the plurality of second transmittance regions are alternately aligned on the plane perpendicular to the first direction, and the second polarization regions are employed to transmit through linear polarization light in a polarization axis of the second polarization regions, and the second transmittance regions are employed to transmit through natural light.

Vertical projections of the plurality of first polarization regions on the liquid crystal layer completely cover the plurality of display regions correspondingly one to one, and vertical projections of the plurality of second polarization regions on the liquid crystal layer completely cover the plurality of display regions correspondingly one to one.

Both an area of the first polarization regions of the first polarizer and an area of the second polarization regions of the second polarizer are larger than an area of the display regions of the liquid crystal layer.

A center of the plurality of first polarization regions of the first polarizer, a center of the plurality of second polarization regions of the second polarizer and a center of the plurality of display regions of the liquid crystal layer are all aligned in the first direction.

Preferably, an area of the first polarization regions of the first polarizer is smaller or equal to the area of the second polarization regions of the second polarizer.

Preferably, the backlight module comprises a backlight source and a light guide plate, and the light guide plate comprises an incident surface, an illuminating surface and a side incident surface connecting the incident surface and the illuminating surface, and the illuminating surface is located toward the first polarizer, and the backlight source is located close to the side incident surface, and the incident surface transmits light entering the light guide plate and reflects light in the light guide plate.

Preferably, the transparent display further comprises a light valve, and the light valve is located close to the incident surface of the light guide plate and covers the incident surface, and the light valve transmits or shields light at one side of the light valve away from the light guide plate.

Preferably, the transparent display further comprises a first substrate and a second substrate, and the first substrate is located between the first polarizer and the liquid crystal layer, and the second substrate is located between the liquid crystal layer and the second polarizer.

Preferably, the transparent display further comprises a first substrate and a second substrate, and the first substrate is located between the first polarizer and the liquid crystal layer, and the second substrate is located at one side of the second polarizer away from the liquid crystal layer.

Compared with prior art, the present invention possesses benefits below:

The polarizer comprises the polarization regions and the transmittance regions at the same time, and the polarization regions are employed to transmit through linear polarization light of the specific direction, and the transmittance regions are employed to transmit through natural light. Therefore, the polarizer can selectively and partially transmits the natural light to be applied for the display of various requirements. The transmittance regions of the polarizer do not filter light. Thus, the display utilizing the polarizer can have higher transmittance and the application is more flexible.

In the transparent display of the present invention, the vertical projections of the plurality of first polarization regions of the first polarizer on the liquid crystal layer completely cover the plurality of display regions correspondingly one to one, and the vertical projections of the plurality of second polarization regions of the second polarizer on the liquid crystal layer completely cover the plurality of display regions correspondingly one to one. Namely, the vertical projections of the plurality of first transmittance regions of the first polarizer on the liquid crystal layer fall in the plurality of transparent regions correspondingly one to one, and the vertical projections of the plurality of second transmittance regions the second polarizer on the liquid crystal layer fall in the plurality of transparent regions correspondingly one to one. Therefore, the first polarizer and the second polarizer do not absorb the light entering or outgoing the positions of the transparent regions of the liquid crystal layer. It tremendously raises the transmittance of the light at the transparent display positions of the transparent display, and promotes the brightness and the image quality of the background object pictures shown by the transparent display.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments.

Figure 1:
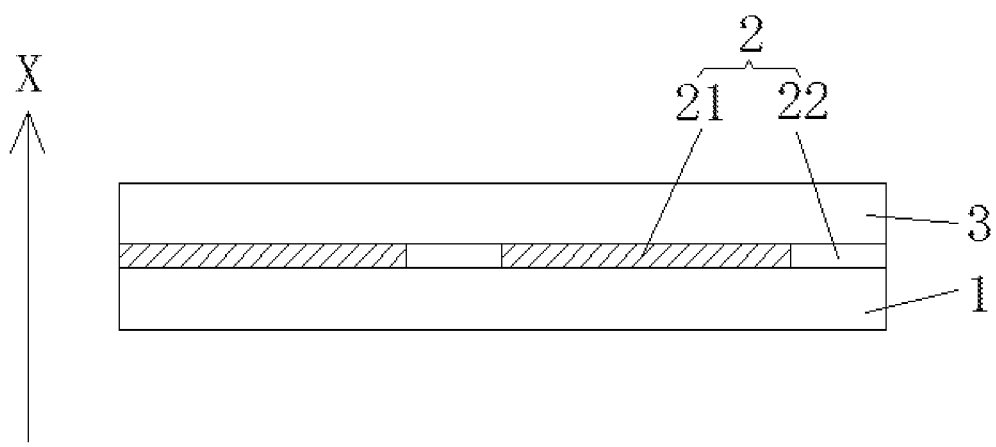
FIG. 1 is a structure diagram of a polarizer provided by the embodiment of the present invention.

Please refer to FIG. 1. The embodiment of the present invention provides a polarizer. The X direction shown in FIG. 1 is defined to be the first direction X. The polarizer comprising a first protective layer 1, a polarization layer 2 and a second protective layer 3, which are sequentially stacked up in the first direction X, and the polarization layer 2 comprises a plurality of polarization regions 21 and a plurality of transmittance regions 22, and the plurality of polarization regions 21 and the plurality of transmittance regions 22 are alternately aligned on a plane perpendicular to the first direction X, and the polarization regions 21 are employed to transmit through linear polarization light in a polarization axis of the polarization regions 21, and the transmittance regions 22 are employed to transmit through natural light.

It is understandable that the polarizer comprises the polarization regions 21 and the transmittance regions 22 at the same time, and the polarization regions 21 are employed to transmit through linear polarization light of the specific direction, and the transmittance regions 22 are employed to transmit through natural light. Therefore, the polarizer can selectively and partially transmits the natural light. The polarizer of this embodiment can be applied for the display of various requirements. The transmittance regions 22 of the polarizer do not filter light. Thus, the display utilizing the polarizer can have higher transmittance and the application is more flexible.

Furthermore, the transmittance regions 22 of the polarization layer 2 are filled with transparent glue or air. Certainly, the transmittance regions 22 can be filled with other optical material of not absorbing light.

Furthermore, the polarization regions 21 of the polarization layer 2 are filled with organic polarization plate or metal wire gate polarization plate. Certainly, the polarization layer 2 also can be filled with polarization plate of other material.

It is understandable that the polarizer of this embodiment can have kinds of manufacture methods. For example:

First, attaching one side of the overall organic polarization plate on one side of the first protective layer 1;

then, partially removing the organic polarization plate by etching, and the remained organic polarization plate forms the polarization regions 21;

and then, coating transparent glue at the original positions of the removed organic polarization plate to form the transmittance regions 22;

finally, laminating the second protective layer 3 at the other side of the organic polarization plate to form the polarizer.

Certainly, it does not have to coat the transparent glue at the original positions of the removed organic polarization plate but the air layer is directly used to form the transmittance regions 22.

Furthermore, the polarization regions 21 also can utilize the metal wire gate polarization plate. Then, the space of the transmittance regions 22 can formed by etching a whole metal wire gate polarization plate, or the space of the metal wire gate polarization plate can be directly reserved as forming the polarization regions 21.

Figure 2:
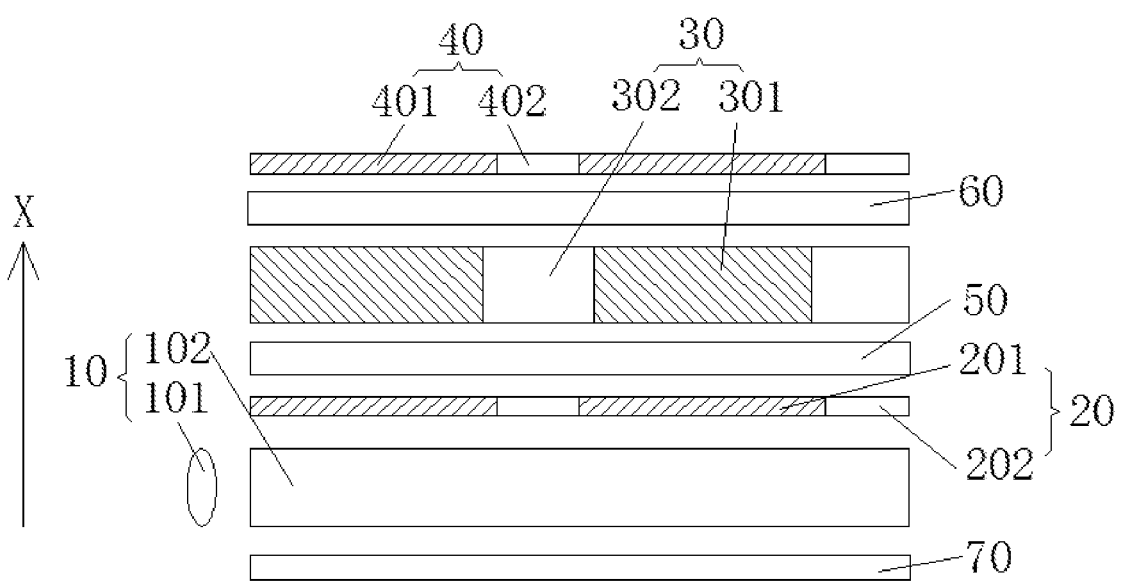
FIG. 2 is a structure diagram of a transparent display provided by the embodiment of the present invention.

Please refer to FIG. 2. The embodiment of the present invention further provides a transparent display. The X direction shown in FIG. 2 is defined to be the first direction X. The transparent display comprises a backlight module 10, a first polarizer 20, a liquid crystal layer 30 and a second polarizer 40, which are sequentially stacked up in the first direction X. The first polarizer 20 comprises a first polarization layer, and the first polarization layer comprises a plurality of first polarization regions 201 and a plurality of first transmittance regions 202, and the plurality of first polarization regions 201 and the plurality of first transmittance regions 202 are alternately aligned on a plane perpendicular to the first direction X, and the first polarization regions 201 are employed to transmit through linear polarization light in a polarization axis of the first polarization regions 201, and the first transmittance regions 202 are employed to transmit through natural light. The liquid crystal layer 30 comprises a plurality of display regions 301 and a plurality of transparent regions 302, and the plurality of display regions 301 and the plurality of transparent regions 302 are alternately aligned on the plane perpendicular to the first direction X. The second polarizer 40 comprises a second polarization layer, and the second polarization layer comprises a plurality of second polarization regions 401 and a plurality of second transmittance regions 402, and the plurality of second polarization regions 401 and the plurality of second transmittance regions 402 are alternately aligned on the plane perpendicular to the first direction X, and the second polarization regions 401 are employed to transmit through linear polarization light in a polarization axis of the second polarization regions 401, and the second transmittance regions 402 are employed to transmit through natural light. Vertical projections of the plurality of first polarization regions 201 on the liquid crystal layer 30 completely cover the plurality of display regions 301 correspondingly one to one, and vertical projections of the plurality of second polarization regions 401 on the liquid crystal layer 30 completely cover the plurality of display regions 301 correspondingly one to one.

It is understandable that in the transparent display of this embodiment, the vertical projections of the plurality of first polarization regions 201 of the first polarizer 20 on the liquid crystal layer 30 completely cover the plurality of display regions 301 correspondingly one to one, and the vertical projections of the plurality of second polarization regions 401 of the second polarizer 40 on the liquid crystal layer 30 completely cover the plurality of display regions 301 correspondingly one to one. Namely, the vertical projections of the plurality of first transmittance regions 202 of the first polarizer 20 on the liquid crystal layer 30 fall in the plurality of transparent regions 302 correspondingly one to one, and the vertical projections of the plurality of second transmittance regions 402 of the second polarizer 40 on the liquid crystal layer 30 fall in the plurality of transparent regions 302 correspondingly one to one. Therefore, the first polarizer 20 and the second polarizer 40 do not absorb the light entering or outgoing the positions of the transparent regions 302 of the liquid crystal layer 30. It tremendously raises the transmittance of the light at the transparent display positions of the transparent display, and promotes the brightness and the image quality of the background object pictures shown by the transparent display. Certainly, the aforesaid complete cover refers to that both the areas of the vertical projections of the first polarization regions 201 and the second polarization regions 401 on the liquid crystal layer can larger than or equal to the area of the display regions 301.

Furthermore, both an area of the first polarization regions 201 of the first polarizer 20 and an area of the second polarization regions 401 of the second polarizer 40 are larger than an area of the display regions 301 of the liquid crystal layer 30. The first polarization regions 201 and the second polarization regions 401 can completely cover the light entering or outgoing the positions of the display regions 301 of the liquid crystal layer 30 to prevent that unnecessary light leaks from the positions which are not covered with the polarizer to influence the display image quality while watching the image shown by the display regions 301 of the transparent display from the large view angle.

Furthermore, a center of the plurality of first polarization regions 201 of the first polarizer 20, a center of the plurality of second polarization regions 401 of the second polarizer 40 and a center of the plurality of display regions 301 of the liquid crystal layer 30 are all aligned in the first direction. Namely, the partial regions of the transparent regions 302 close to the display regions 301 cover all the first polarization regions 201 and the second polarization regions 401 to prevent that unnecessary light leaks from the positions which are not covered with the polarizer in the transparent regions 302 to influence the display image quality while watching the image shown by the display regions 301 of the transparent display from the large view angle. The large view angle display quality of the transparent display can be promoted in advance.

Furthermore, an area of the first polarization regions 201 of the first polarizer 20 is smaller or equal to the area of the second polarization regions 401 of the second polarizer 40. The transparent display of this embodiment prevents that the light in the display regions 301 reveals the background object picture display positions of the transparent display mainly by that the area of the second polarization regions 402 of the second polarizer 40 is larger than the area of the display regions 301 of the liquid crystal layer 30 (i.e. being aligned with the positions of the transparent regions 302 of the liquid crystal layer 30 in the first direction X). Therefore, it can be ensured that under circumstance that the light of the background object does not enter the display regions 301, the area of the first polarization regions 201 of the first polarizer 20 can be properly reduced, and the area of the second polarization regions 401 of the second polarizer 40 can be properly increased. Namely, the area of the first transmittance regions 202 is increased, and the area of the second transmittance regions 402 is decreased so that the area of the first transmittance regions 202 is larger than the area of the second transmittance regions 402. The transmittance of the light at the transparent display positions of the transparent display is raised in advance.

As being an preferred embodiment of the present invention, as shown in FIG. 2, the backlight module 10 of the transparent display comprises a backlight source 101 and a light guide plate 102, and the light guide plate 102 comprises an incident surface, an illuminating surface and a side incident surface connecting the incident surface and the illuminating surface, and the illuminating surface is located toward the first polarizer 20, and the backlight source 101 is located close to the side incident surface, and the incident surface transmits light entering the light guide plate 102 and reflects light in the light guide plate 102.

Furthermore, as shown in FIG. 2, the transparent display further comprises a light valve 70, and the light valve 70 is located close to the incident surface of the light guide plate 102 and covers the incident surface, and the light valve 70 transmits or shields light at one side of the light valve 70 away from the light guide plate 102. It is understandable that as the transparent display perform the transparent demonstration, the light valve 70 is controlled to allow the light at one side of the light valve 70 away from the light guide plate 102 to transmit. Namely, the light valve 70 projects the light, and the background object light enters the incident light of the light guide plate 102, and the transparent display shows the display image pictures and the background object pictures at the same time; as the transparent display merely shows the display image pictures, the light valve 70 can be controlled to shield the background object light, i.e. the light valve 70 reflects or absorbs the background object light to prevent the background object light from entering the incident surface of the light guide plate 102 to affect the display quality of the image pictures. The transparent display can achieve the high quality display of the display image pictures.

Furthermore, as shown in FIG. 2, the transparent display further comprises a first substrate 50 and a second substrate 60, and the first substrate 50 is located between the first polarizer 20 and the liquid crystal layer 30, and the second substrate 60 is located between the liquid crystal layer 30 and the second polarizer 40.

Figure 3:
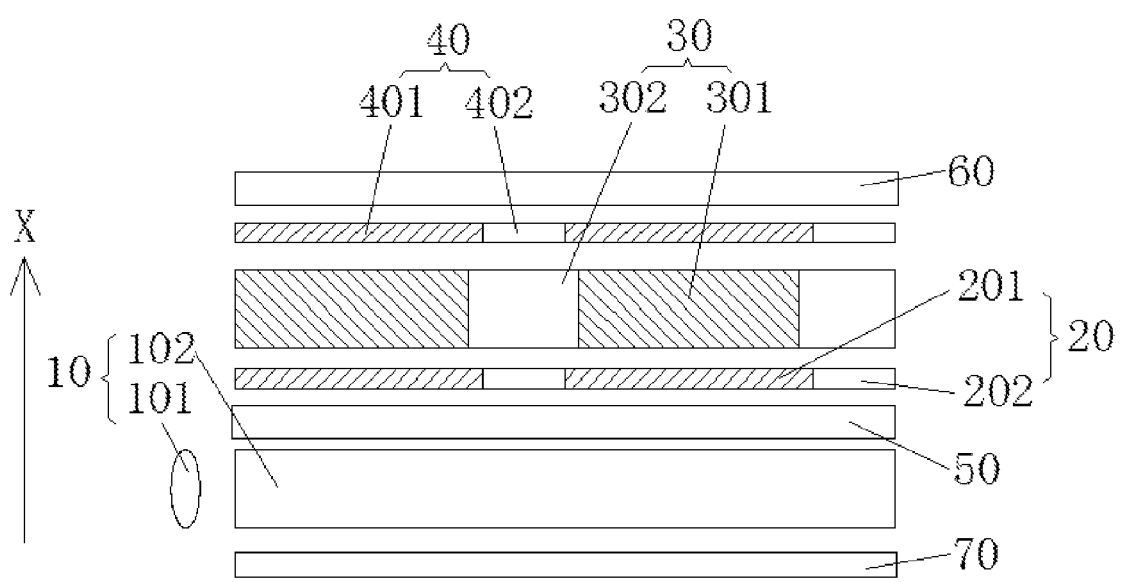
FIG. 3 is a structure diagram of another transparent display provided by the embodiment of the present invention.

Please refer to FIG. 3. AS being another preferred embodiment of the present invention, the first substrate 50 also can be located between the first polarizer 20 and the liquid crystal layer 30, and then, the second substrate 60 is located at one side of the second polarizer 40 away from the liquid crystal layer 30. In comparison with the embodiment shown in FIG. 2, the areas of the first transmittance regions 202 of the first polarizer 20 and the second transmittance regions 402 of the second polarizer 40 in this embodiment can properly increased. Because the first polarizer 20 and the second polarizer 40 are closer to the liquid crystal layer, the smaller area of the first polarization regions 201 and the smaller area of the second polarization regions 401 are enough to prevent that the light in the display regions 301 transmits the transparent regions.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A transparent display, comprising a backlight module, a first polarizer, a liquid crystal layer and a second polarizer, which are sequentially stacked up in a first direction;
    wherein the first polarizer comprises a first polarization layer, and the first polarization layer comprises a plurality of first polarization regions and a plurality of first transmittance regions, and the plurality of first polarization regions and the plurality of first transmittance regions are alternately aligned on a plane perpendicular to a first direction, and the first polarization regions are employed to transmit through linear polarization light in a polarization axis of the first polarization regions, and the first transmittance regions are employed to transmit through natural light;
    the liquid crystal layer comprises a plurality of display regions and a plurality of transparent regions, and the plurality of display regions and the plurality of transparent regions are alternately aligned on the plane perpendicular to the first direction;
    the second polarizer comprises a second polarization layer, and the second polarization layer comprises a plurality of second polarization regions and a plurality of second transmittance regions, and the plurality of second polarization regions and the plurality of second transmittance regions are alternately aligned on the plane perpendicular to the first direction, and the second polarization regions are employed to transmit through linear polarization light in a polarization axis of the second polarization regions, and the second transmittance regions are employed to transmit through natural light; and
    vertical projections of the plurality of first polarization regions on the liquid crystal layer completely cover the plurality of display regions correspondingly one to one, and vertical projections of the plurality of second polarization regions on the liquid crystal layer completely cover the plurality of display regions correspondingly one to one; and
    wherein both an area of the first polarization regions of the first polarizer and an area of the second polarization regions of the second polarizer are larger than an area of the display regions of the liquid crystal layer.

2. The transparent display according to claim 1, wherein a center of the plurality of first polarization regions of the first polarizer, a center of the plurality of second polarization regions of the second polarizer and a center of the plurality of display regions of the liquid crystal layer are all aligned in the first direction.

3. The transparent display according to claim 2, wherein an area of the first polarization regions of the first polarizer is smaller or equal to the area of the second polarization regions of the second polarizer.

4. The transparent display according to claim 2, wherein the backlight module comprises a backlight source and a light guide plate, and the light guide plate comprises an incident surface, an illuminating surface and a side incident surface connecting the incident surface and the illuminating surface, and the illuminating surface is located toward the first polarizer, and the backlight source is located close to the side incident surface, and the incident surface transmits light entering the light guide plate and reflects light in the light guide plate.

5. The transparent display according to claim 4, wherein the transparent display further comprises a light valve, and the light valve is located close to the incident surface of the light guide plate and covers the incident surface, and the light valve transmits or shields light at one side of the light valve away from the light guide plate.

6. The transparent display according to claim 1, wherein the transparent display further comprises a first substrate and a second substrate, and the first substrate is located between the first polarizer and the liquid crystal layer, and the second substrate is located between the liquid crystal layer and the second polarizer.

7. The transparent display according to claim 1, wherein the transparent display further comprises a first substrate and a second substrate, and the first substrate is located between the first polarizer and the liquid crystal layer, and the second substrate is located at one side of the second polarizer away from the liquid crystal layer.

* * * * *